UNITED STATES PATENT OFFICE.

EDWARD C. EWEN, OF SAGINAW, MICHIGAN.

METHOD OF RECOVERING GRAPHITE FROM SLAG.

1,271,146.  Specification of Letters Patent.  Patented July 2, 1918.

No Drawing.  Application filed December 17, 1917.  Serial No. 207,548.

*To all whom it may concern:*

Be it known that I, EDWARD C. EWEN, a citizen of the United States, residing at Saginaw, in the county of Saginaw and State of Michigan, have invented certain new and useful Improvements in Methods of Recovering Graphite from Slag; and I do hereby declare the following to be a full, clear, and exact description of the invention, such as will enable others skilled in the art to which it appertains to make and use the same.

This invention relates to a method of recovering graphitic carbon from cinder or slag such as is formed in the operation of blast furnaces, reverberatory furnaces, cupolas, open hearth furnaces, Bessemer converters and the like, and the improvement pertains more particularly to an improved method of handling or manipulating the slag which constitutes a by-product of such furnace operations.

As is well known, furnace slag contains considerable quantities of graphitic carbon in the form of flake graphite and my improved method has for one of its objects the manipulation of the slag in such manner that the percentage of recoverable graphitic carbon will be largely increased.

A further object of the improved method is to make possible the recovery of a considerable quantity of metallic iron from the slag.

Blast furnace slag, as is well known, is a by-product of furnace operation and floats on the surface of the ladles of molten metal which are drawn from the furnace. When the molten metal is poured from the ladle the mass or cake of slag remains in the bottom of the ladle in the form of a partially solidified body, which upon cooling becomes exceedingly hard. It contains considerable quantities of iron and the surfaces of the cake are partly covered with flakes of graphite, and the body of the cake contains graphite cemented by other substances.

Heretofore efforts have been made to recover this graphite by crushing the chunks of slag and screening the crushed material, after which the graphite was separated from the heavier ingredients by air separation, as in a fanning mill.

I have discovered a method of manipulating the slag while still hot in the ladle, whereby the mass of slag is converted into a honeycomb or cellular and to a considerable extent disintegrated granular mass of small cohesion, very heavily impregnated with flakes of pure graphite.

By this method I am enabled to recover not only a very much larger percentage of graphite, but I do away with the most expensive step of the former process, namely, the crushing of solid chunks of hard slag.

My method also reduces the slag to such condition that a large percentage of pure iron can be easily recovered from it.

It has been the custom, heretofore, in blast furnaces practice to remove the slab or cake of slag, constituting the skimmings, from the ladle and allow it to solidify, it thereupon becoming almost as solid as hard rock or iron, exceedingly difficult to disintegrate by grinding or crushing.

In my improved method I do not permit the skimmings or mass of slag to become hard and form solid chunks. On the contrary, I prevent it from so forming, by a very simple and effective manipulation of the molten metal in the ladles.

My method may be carried out in various ways, but I prefer the following, which conforms with present blast furnace practice.

Ladles are in practice commonly filled with molten metal tapped from the furnace and these ladles are hauled away from the furnace in groups of two or more, usually three, to the pig iron molds, or elsewhere.

In carrying out the first step of my method for recovering graphite and iron from the slag, I pour the molten metal from the first ladle, leaving the hot crust of slag in the bottom of the ladle. I next pour the molten metal from the second ladle into the first ladle, the metal falling on the mass of slag which remained in the bottom of the first ladle. I then pour the molten metal from the first ladle as before, leaving the slag in the bottom of the ladle. In like manner if more than two ladles are used the contents of the subsequent ladles are successively poured into the first ladle and are in turn emptied therefrom. Thus, the first ladle has been emptied of its molten metal three times and the coarse slag in the first ladle has been twice subjected to the pouring over it of a mass of molten metal.

It will be understood that the first emptying of ladle No. 1 into the pig molds or elsewhere is done slowly. This results in a considerable amount of slag remaining in the ladle after the molten metal has been poured out. When the molten metal from ladles Nos. 2 and 3 is poured into ladle No. 1, the pouring is more rapid and consequently a less amount of slag remains in those ladles, because it has had less time to cool while pouring.

I have not determined to my entire satisfaction what the changes are that occur in the slag of the first ladle, but it is a fact that this slag instead of coming from the first ladle in the form of a heavy crust or cake of great solidity, now comes out as a practically granular thoroughly honeycombed and easily disintegratable assortment of pieces of slag.

Upon examination of these pieces, they are found to be filled with channels or passageways leading in all directions and the interior surface of each channel or passageway is found to be lined with large flakes of commercial graphite. The inside surfaces of these cells glisten as if polished, by reason of the reflection of light from the surfaces of the graphite flakes. Upon the slightest jar or agitation the graphite flakes fall in a shower, whereas a chunk of furnace slag as ordinarily formed shows the presence of only a small amount of graphite on its surface, the greater part of the graphite appearing to be buried beneath the surface and cemented in place by particles of fused material.

By the method above described the yield of graphite from a given amount of molten metal is enormously increased. This increase in the yield of graphite is perhaps due to the sudden reheating of the mass of slag by the pouring over it of molten metal, or it may be due to the breaking up of the cake of slag by the impact of the molten metal, or it may be due to the introduction of air into the mass by the agitation incident to the pouring of the molten metal onto the slag, or perhaps to a combination of all of these causes. I am unable at this time to say positively what the chemical or physical actions are that take place in the ladle, but the results are certain as above described.

Another important result of this method of treating the slag is that a large quantity of particles of pure iron are liberated and by a mere screening process can be removed. In fact, sufficient iron is frequently recovered by this method to pay the cost of the entire operation, the value of the recovered graphite being a net gain.

After the foregoing treatment in the ladles, the slag after solidifying can be screened by passing it over a screen of about one-quarter inch mesh. Mere screening is sufficient to disintegrate a large proportion of the slag without any preliminary crushing and the screened material is found to consist largely of particles of iron mixed with flakes of graphite. Passing this mixture through a fanning mill separates the graphite from the iron and the graphite is found upon analysis to be a high grade commercial product.

Having thus described my invention, what I desire to secure by Letters Patent is:

1. The method of obtaining graphite from slag, which consists in pouring the metal into a ladle, emptying the same but holding back the slag, pouring another charge of metal upon the residue from the first pouring, and finally removing the metal from the ladle while holding back the slag.

2. The method of obtaining graphite from slag, which consists in pouring the metal into a ladle, emptying the same but holding back the slag, pouring another charge of metal upon the residue from the first pouring and finally removing the metal from the ladle while holding back the residue in the form of a mass of honeycombed or cellular structures of reduced cohesion.

3. The method of obtaining graphite from slag, which consists in pouring the metal into a ladle, emptying the same but holding back the slag, pouring another charge of metal upon the residue from the first pouring, removing the metal from the ladle while holding back the slag, screening the slag and finally subjecting the screened material to the action of an air separator.

In testimony whereof, I affix my signature.

EDWARD C. EWEN.

Copies of this patent may be obtained for five cents each, by addressing the "Commissioner of Patents, Washington, D. C."